US012719563B2

(12) United States Patent
Lee et al.

(10) Patent No.: US 12,719,563 B2
(45) Date of Patent: Aug. 25, 2026

(54) ELECTRONIC DEVICE AND COMMUNICATION METHOD THEREOF

(71) Applicant: AGENCY FOR DEFENSE DEVELOPMENT, Daejeon (KR)

(72) Inventors: Ju Hyung Lee, Daejeon (KR); Jae Won Choi, Daejeon (KR); Byung Seok Woo, Daejeon (KR); Ki Keun Kim, Daejeon (KR); Myung Jin Jang, Daejeon (KR); Hak Keum Seo, Daejeon (KR); Chul Hee Choi, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 420 days.

(21) Appl. No.: 18/370,077

(22) Filed: Sep. 19, 2023

(65) Prior Publication Data

US 2024/0333377 A1 Oct. 3, 2024

(30) Foreign Application Priority Data

Mar. 31, 2023 (KR) ........................ 10-2023-0043036

(51) Int. Cl.
*H04B 7/185* (2006.01)

(52) U.S. Cl.
CPC ................................ *H04B 7/18513* (2013.01)

(58) Field of Classification Search
CPC ....................... H04B 7/18513; H04B 7/15592; H04B 7/185; H04B 7/18532; H04B 7/18519
USPC .......................................................... 370/316
See application file for complete search history.

(56) References Cited

U.S. PATENT DOCUMENTS

| | | | | |
|---|---|---|---|---|
| 11,196,478 | B1 * | 12/2021 | Nagelberg | H04N 7/185 |
| 2009/0047901 | A1 * | 2/2009 | Yu | H04B 7/026 370/328 |
| 2009/0316763 | A1 | 12/2009 | Erkip et al. | |
| 2010/0127925 | A1 | 5/2010 | Conroy et al. | |
| 2012/0301136 | A1 | 11/2012 | Chang | |
| 2020/0178137 | A1 | 6/2020 | Hassan Hussein et al. | |
| 2021/0084697 | A1 | 3/2021 | Damnjanovic et al. | |

(Continued)

FOREIGN PATENT DOCUMENTS

| | | | |
|---|---|---|---|
| CN | 111464234 | A | 7/2020 |
| KR | 10-1377427 | B1 | 3/2014 |

(Continued)

OTHER PUBLICATIONS

Combined Search and Examination Report dated Aug. 6, 2024 for corresponding GB Application No. 2404509.8.

(Continued)

*Primary Examiner* — Xuan Lu
(74) *Attorney, Agent, or Firm* — MILES & STOCKBRIDGE P.C.

(57) ABSTRACT

Disclosed is a communication method of an electronic device. Specifically, the communication method of the electronic device may include receiving, from a plurality of relay devices, a plurality of signals of a downlink associated with a signal of an uplink transmitted by a first electronic device, restoring a plurality of pieces of data with the plurality of signals being processed, and identifying reception data corresponding to transmission data included in the signal with the plurality of pieces of data being multiplexed based on a set multiplexing.

11 Claims, 5 Drawing Sheets

(56) References Cited

U.S. PATENT DOCUMENTS

| | | | | |
|---|---|---|---|---|
| 2021/0211169 | A1* | 7/2021 | Xue | ...................... H04W 16/28 |
| 2022/0386259 | A1 | 12/2022 | Chen et al. | |
| 2022/0393841 | A1 | 12/2022 | Tsai et al. | |

FOREIGN PATENT DOCUMENTS

| | | | | |
|---|---|---|---|---|
| KR | 101400446 | B1 | 5/2014 | |
| KR | 10-2421909 | B1 | 7/2022 | |
| KR | 2022-0137096 | A | 10/2022 | |
| WO | WO-2007079638 | A1 * | 7/2007 | ......... H04B 7/15542 |

OTHER PUBLICATIONS

Lin Bai et al., "Multi-Satellite Relay Transmission in 5G: Concepts, Techniques, and Challenges", in IEEE Network, vol. 32, No. 5, pp. 38-44, Sep./Oct. 2018, published Sep. 27, 2018.

Office Action w/English translation mailed Jul. 12, 2024 in corresponding Korean Application No. 10-2023-0043036.

* cited by examiner

ELECTRONIC DEVICE AND COMMUNICATION METHOD THEREOF

PRIORITY INFORMATION

This application claims the benefit of Korean Patent Application No. 10-2023-0043036 filed on Mar. 31, 2023 in the Korean Intellectual Property Office, which is incorporated herein by reference in its entirety.

FIELD OF THE INVENTION

The present disclosure generally relates to an electronic device and a communication method thereof.

DESCRIPTION OF THE RELATED ART

With growth in a demand level for a communication service, a volume of traffic to transmit is increased. In order to transmit large traffic in a short time, higher transmission speed is required. Generally, when a transmission speed is increased, a duration time of a transmitted symbol is decreased, and thus bit error rate performance of a reception signal is deteriorated. In order to overcome such a performance deterioration, various communication methods may be applied.

A relay communication system among the various communication methods is a system in which a relay device is installed between a transmission terminal and a reception terminal and relays a signal between the transmission terminal and the reception terminal when direct communication between the transmission terminal and the reception terminal is impossible due to a geographical/spatial limitation. Particularly, when the relay communication system is a satellite communication system, the demand level for the communication service grows, and the volume of the traffic is increased. Accordingly, there may be concern for an increase in a bit error rate of the signal transmitted and received through the relay device.

SUMMARY OF THE INVENTION

Accordingly, the present invention is directed to an electronic device and a communication method thereof that substantially obviates one or more problems due to limitations and disadvantages of the related art.

According to an aspect, there is provided a communication method of an electronic device, the communication method comprising receiving, from a plurality of relay devices, a plurality of signals of a downlink associated with a signal of an uplink transmitted by a first electronic device, restoring a plurality of pieces of data with the plurality of signals being processed, and identifying reception data corresponding to transmission data included in the signal with the plurality of pieces of data being multiplexed based on a set multiplexing rule.

According to an example embodiment, first data may be data identified with the signal being processed in the plurality of relay devices, and when the plurality of relay devices divides the first data into a plurality of pieces of first data based on a set division rule, the plurality of signals may be a plurality of signals respectively corresponding to the plurality of pieces of first data transmitted from the plurality of relay devices.

According to an example embodiment, each of the plurality of pieces of first data may include at least a portion of the first data according to the set division rule.

According to an example embodiment, the plurality of signals may be signals having different frequencies and generated with the plurality of pieces first data being modulated in the plurality of relay devices, and the identifying of the reception data may comprises identifying, based on a plurality of frequencies corresponding to the plurality of signals, an order associated with multiplexing of the plurality of pieces of data, and identifying, based on the order, the reception data with the plurality of pieces of data being multiplexed.

According to an example embodiment, the identifying of the reception data may comprises identifying, based on values in set positions of the plurality of pieces of data, an order associated with multiplexing of the plurality of pieces of data, and identifying, based on the order, the reception data by multiplexing the plurality of pieces of data.

According to an example embodiment, the restoring of the plurality of pieces of data may comprises identifying a plurality of pieces of demodulated data with the plurality of signals being demodulated, and restoring the plurality of pieces of data with an error in the plurality of pieces of demodulated data being corrected.

According to an example embodiment, the plurality of relay devices may be a plurality of small communication satellites.

According to an example embodiment, the plurality of relay devices may be simultaneously positioned in a first area associated with a first antenna included in the first electronic device and an area associated with an antenna included in the electronic device, and the set multiplexing rule corresponds to a set division rule in the plurality of relay devices.

According to another aspect, there is also provided an electronic device comprising a transceiver configured to receive, from a plurality of relay devices, a plurality of signals of a downlink associated with a signal of an uplink transmitted by a first electronic device, a storage configured to store one or more instructions, and a processor configured to restore a plurality of pieces of data with the plurality of signals being processed and identify reception data corresponding to transmission data included in the signal with the plurality of pieces of data being multiplexed based on a set multiplexing rule.

According to still another aspect, there is also provided a non-transitory computer-readable recording medium comprising a computer program for performing a communication method of an electronic device, and the communication method comprises receiving, from a plurality of relay devices, a plurality of signals of a downlink associated with a signal of an uplink transmitted by a first electronic device, restoring a plurality of pieces of data with the plurality of signals of the downlink being processed, and identifying reception data corresponding to transmission data included in the signal with the plurality of pieces of data being multiplexed based on a set multiplexing rule.

According to still another aspect, there is also provided a communication method of a relay device, the communication method comprising receiving a signal of an uplink transmitted by a first electronic device, identifying first data corresponding to transmission data included in the signal with the signal being processed, identifying division data including at least a portion of the first data based on a set division rule, and transmitting a signal of a downlink including the division data to an electronic device.

According to still another aspect, there is also provided a communication system of a plurality of electronic devices using a relay device, the communication system comprising a first electronic device, a plurality of relay devices, and an electronic device, and the first electronic device transmits a signal of an uplink including transmission data, the plurality of relay devices identifies first data corresponding to the transmission data with the signal being processed, divides the first data into a plurality of pieces of first data based on a set division rule, and transmits a plurality of signals of a downlink corresponding to the plurality of pieces of first data to the electronic device, and the electronic device receives the plurality of signals from the plurality of relay devices, restores a plurality of pieces of data with the plurality of signals being processed, and identifies reception data corresponding to the transmission data with the plurality of pieces of data being multiplexed based on a set multiplexing rule.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to example embodiments, it is possible to, by a communication method of an electronic device, restore a plurality of pieces of data by processing a plurality of signals associated with a signal transmitted by a first electronic device and identify reception data with the plurality of pieces of data being multiplexed based on a set multiplexing rule. Particularly, the electronic device may identify the reception data by multiplexing the plurality of pieces of data. Thus, a bit error rate of the reception data may be improved.

Effects of the present disclosure are not limited to those described above and other effects may be made apparent to those skilled in the art from the following description. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Figure 1:
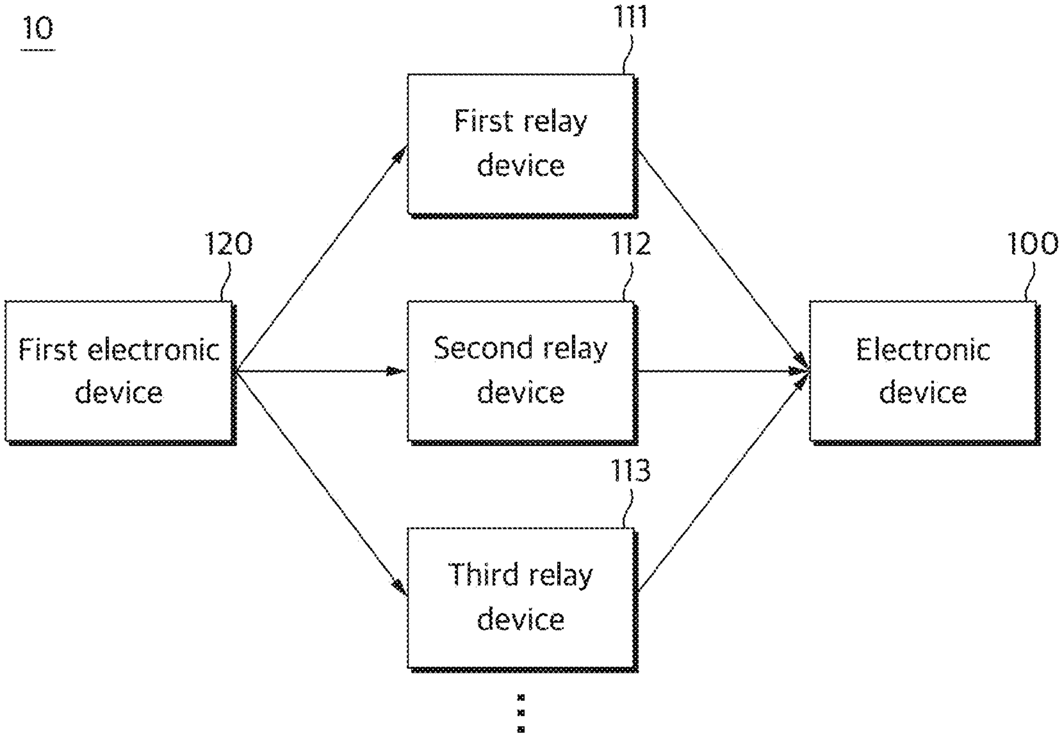
FIG. 1 is a diagram illustrating a communication system in which a communication method of an electronic device is implementable according to an example embodiment.

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it is noted that the terms used herein should be construed based on practical meanings thereof and the entire content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

Throughout the specification, expression "at least one of a, b, and c" may include 'a only', 'b only', 'c only', 'a and b', 'a and c', 'b and c', or 'all of a, b, and c'.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

In describing the example embodiments, descriptions of technical contents that are well known in the art to which the present disclosure belongs and are not directly related to the present specification will be omitted. This is to more clearly communicate without obscuring the subject matter of the present specification by omitting unnecessary description.

For the same reason, in the accompanying drawings, some components are exaggerated, omitted or schematically illustrated. In addition, the size of each component does not fully reflect the actual size. The same or corresponding components in each drawing are given the same reference numerals.

Advantages and features of the present disclosure and methods of achieving them will be apparent from the following example embodiments that will be described in more detail with reference to the accompanying drawings. It is noted, however, that the present disclosure is not limited to the following example embodiments, and may be implemented in various forms. Accordingly, the example embodiments are provided only to disclose the present disclosure and let those skilled in the art know the category of the present disclosure. In the drawings, embodiments of the present disclosure are not limited to the specific examples provided herein and are exaggerated for clarity. The same reference numerals or the same reference designators denote the same elements throughout the specification.

At this point, it will be understood that each block of the flowchart illustrations and combinations of flowchart illustrations may be performed by computer program instructions. Since these computer program instructions may be mounted on a processor of a general-purpose computer, special purpose computer, or other programmable data processing equipment, those instructions executed through the computer or the processor of other programmable data processing equipment may create a means to perform the functions be described in flowchart block(s). These computer program instructions may be stored in a computer usable or computer readable memory that can be directed to a computer or other programmable data processing equipment to implement functionality in a particular manner, and thus the computer usable or computer readable memory. It is also possible for the instructions stored in to produce an article of manufacture containing instruction means for performing the functions described in the flowchart block(s). Computer program instructions may also be mounted on a computer or other programmable data processing equipment, such that a series of operating steps may be performed on the computer or other programmable data processing equipment to create a computer-implemented process to create a computer or other programmable data. Instructions for performing the processing equipment may also provide steps for performing the functions described in the flowchart block(s).

In addition, each block may represent a portion of a module, segment, or code that includes one or more executable instructions for executing a specified logical function(s). It also is noted that in some alternative implementations, the functions noted in the blocks may occur out of order. For example, the two blocks shown in succession may in fact be executed substantially concurrently, or the blocks may sometimes be executed in the reverse order, depending on the corresponding function.

Hereinafter, example embodiments of the present disclosure will be described with reference to the drawings.

FIG. 1 is a diagram illustrating a communication system in which a communication method of an electronic device is implementable according to an example embodiment.

A communication system 10 of a plurality of electronic devices using a relay device according to various example embodiments may be implemented by devices of various types. Referring to FIG. 1 according to an example embodiment, the communication system 10 may include an electronic device 100, a first relay device 111, a second relay device 112, a third relay device 113, and a first electronic device 120. Only elements associated with an example embodiment of the present disclosure are shown in the communication system 10 illustrated by FIG. 1. Thus, those skilled in the art associated with the example embodiment of the present disclosure may understand that other elements in general use may be further included in addition to the elements shown in FIG. 1.

Each of the electronic device 100, the first relay device 111, the second relay device 112, the third relay device 113, and the first electronic device 120 may include a transceiver, a storage, and a processor. In addition, each of the electronic device 100, the first relay device 111, the second relay device 112, the third relay device 113, and the first electronic device 120 may be a unit that processes at least one function or operation, which may be implemented by hardware or software, or a combination of hardware and software. Meanwhile, in overall example embodiments, each of the electronic device 100, the first relay device 111, the second relay device 112, the third relay device 113, and the first electronic device 120 is referred to as a separate device or server, but they may be logically divided structures, and at least a portion of them may be implemented by separate functions in a single device or server.

According to an example embodiment, the electronic device 100, the first relay device 111, the second relay device 112, the third relay device 113, and the first electronic device 120 may include computer software or a plurality of computer systems implemented as network servers. For example, at least a portion of the electronic device 100, the first relay device 111, the second relay device 112, the third relay device 113, and the first electronic device 120 may be referred to as a computer system and computer software connected to a lower level device capable of communicating with another network server through a computer network such as an intranet or the Internet to receive a request to perform a task, perform the task, and provide a result of performing the task. In addition, at least a portion of the electronic device 100, the first relay device 111, the second relay device 112, the third relay device 113, and the first electronic device 120 may be understood as broad concepts including a series of application programs that may operate on a network server and various databases built therein or in other connected nodes. At least a portion of the electronic device 100, the first relay device 111, the second relay device 112, the third relay device 113, and the first electronic device 120 may be implemented by using a network server program that is provided in various ways based on an operating system such as DOS, Windows, Linux, UNIX, or MacOS, for example.

The electronic device 100, the first relay device 111, the second relay device 112, the third relay device 113, and the first electronic device 120 may communicate with each other through a network (not illustrated). The network may include a local area network (LAN), a wide area network (WAN), a value added network (VAN), a mobile radio communication network, a satellite communication network, and a combination thereof. Also, the network may be a data network in an inclusive sense of allowing each of network composition entities shown in FIG. 1 to properly communicate with each other and include a wireless communication network.

According to an example embodiment, a communication method of the electronic device 100 may comprise receiving, from a plurality of relay devices, a plurality of signals of a downlink associated with a signal of an uplink transmitted by the first electronic device 120, restoring a plurality of pieces of data with the plurality of signals being processed, and identifying reception data corresponding to transmission data included in the signal with the plurality of pieces of data being multiplexed based on a set multiplexing rule.

According to an example embodiment, a communication method of the relay device may comprise receiving the signal of the uplink transmitted by the first electronic device 120, identifying first data corresponding to the transmission data included in the signal with the signal being processed, identifying division data including at least a portion of the first data based on a set division rule, and transmitting a signal of the downlink including the division data to the electronic device 100.

According to an example embodiment, the communication system 10 of the plurality of electronic devices using the relay device may comprise the first electronic device 120, the plurality of relay devices, and the electronic device 100. The first electronic device 120 may transmit the signal of the uplink including the transmission data. The plurality of relay devices may identify the first data corresponding to the transmission data with the signal being processed, divide the first data into a plurality of pieces of first data based on the set division rule, and transmit the plurality of signals of the downlink corresponding to the plurality of pieces of first data to the electronic device 100. The electronic device 100 may receive the plurality of signals from the plurality of relay devices, restore the plurality of pieces of data with the plurality of signals being processed, and identify the reception data corresponding to the transmission data with the plurality of pieces of data being multiplexed based on the set multiplexing rule.

In the present disclosure, a link may be a connection path between communication nodes. An uplink of a satellite communication system may be a connection path from a ground terminal or an earth station to a satellite relay. A downlink of the satellite communication system may be a connection path from the satellite relay to the ground terminal or the earth station.

Referring to FIG. 1, the plurality of relay devices may include the first relay device 111, the second relay device 112, and the third relay device 113, but it is merely an example. The plurality of relay devices may include a relay device simultaneously positioned in an area associated with an antenna included in the electronic device 100 and a first area associated with a first antenna included in the first electronic device 120. More specifically, the plurality of relay devices may include at least a portion of relay devices positioned on an intersection area in which the area and the first area intersects. The electronic device 100 and the first electronic device 120 may be the ground terminal positioned above the ground. In addition, each of the plurality of relay devices may be the satellite relay or a small communication satellite. The satellite relay may be one of a stationary satellite relay and a mobile satellite relay. A network associated with communication between the plurality of relay devices and the first electronic device 120 and communication between the plurality of relay devices and the electronic device 100 may be the satellite communication network, but it is merely an example.

The communication system 10 of the plurality of electronic devices using the relay device may be the satellite communication system.

For example, in association with a satellite communication system to which a bent-pipe satellite relay is applied, when a first ground terminal transmits a signal to a second ground terminal via the bent-pipe satellite relay, the bent-pipe satellite relay may change a frequency of a received signal of an uplink to a downlink band, amplify the signal, and transmit the signal with a downlink. The second ground terminal may receive a signal of the downlink. In the satellite communication system of a bent-pipe satellite relay method, since transmission signal of the first ground terminal is transmitted with noises of the satellite relay and the second ground terminal accumulated, a deterioration in bit error rate performance may occur.

A satellite communication system to which an on-board processor (OBP) satellite relay is applied may be a communication system for improving a bit error rate by resolving noise accumulation. The OBP satellite relay may include an uplink receiver and a downlink transmitter. The receiver of the OBP satellite relay may receive a signal of an uplink and restore data by performing demodulation and error correction. The transmitter of the OBP satellite relay may perform modulation, channel encoding, signal amplification, or the like by using data provided by the OBP satellite relay and generate a signal of a downlink. Since the uplink and the downlink are separated, a data error due to an uplink noise may be corrected in the OBP receiver. Accordingly, an effect on signal quality of the downlink, which is caused by the uplink noise may be decreased, and the deterioration in the bit error rate performance may be overcome. For example, the communication system 10 of the present disclosure may be the OBP satellite communication system based on the OBP satellite relay.

When a transmission speed in the OBP satellite communication system is increased, with respect to the uplink, signal quality of the signal of the uplink received by the OBP satellite receiver may be secured at a level at which data restoration is possible. In this regard, transmission effective isotropically radiated power (EIRP) of a first ground terminal and a reception gain to noise temperature ratio (G/T) of the satellite relay may be configured (or sufficient) to secure the signal quality. In addition, with respect to the downlink, the signal quality of the signal of the downlink received by a second ground terminal may be secured at the level at which the data restoration is possible. In this regard, transmission EIRP of the satellite relay and reception G/T of the second ground terminal may be configured (or sufficient) to secure the signal quality.

When the relay device is a small satellite relay, a load space and environment thereof may be greatly improper due to a property of a physical environment. In contrast, a load space and environment of the ground terminal may be relatively proper compared to a satellite. Particularly, since a physical size and volume of a micro communication satellite are limited, a loadable device and antenna may be more limited in size. Thus, transmission EIRP and a reception G/T of the micro communication satellite may be lower than or equal to a predetermined level.

With respect to the uplink, since a reception antenna associated with the uplink loadable onto the satellite relay may be limited in size, there may be a limitation of improving a reception G/T of the satellite relay. In contrast, installing a large-sized antenna and a high power amplifier is relatively easy in a first ground terminal compared to the satellite relay, and thus it may be possible to secure high EIRP, which means that an insufficient G/T of the satellite relay may be compensated with high EIRP of the ground terminal.

In contrast, with respect to the downlink, since a reception antenna associated with the downlink loadable onto the satellite relay may be limited in size, securing high EIRP may be difficult. Although a reception G/T of the ground terminal is increased, signal quality is more affected by EIRP, and thus signal quality of the downlink with limited EIRP performance of the satellite relay may be more improper than signal quality of the uplink. In this regard, the transmission speed and a bit error rate in the OBP-based satellite communication system of which the downlink has signal quality more improper than that of the uplink may be greatly improved with the plurality of relay devices using multi-connectivity. A specific communication method of an electronic device will be described with reference to FIG. 2.

Figure 2:
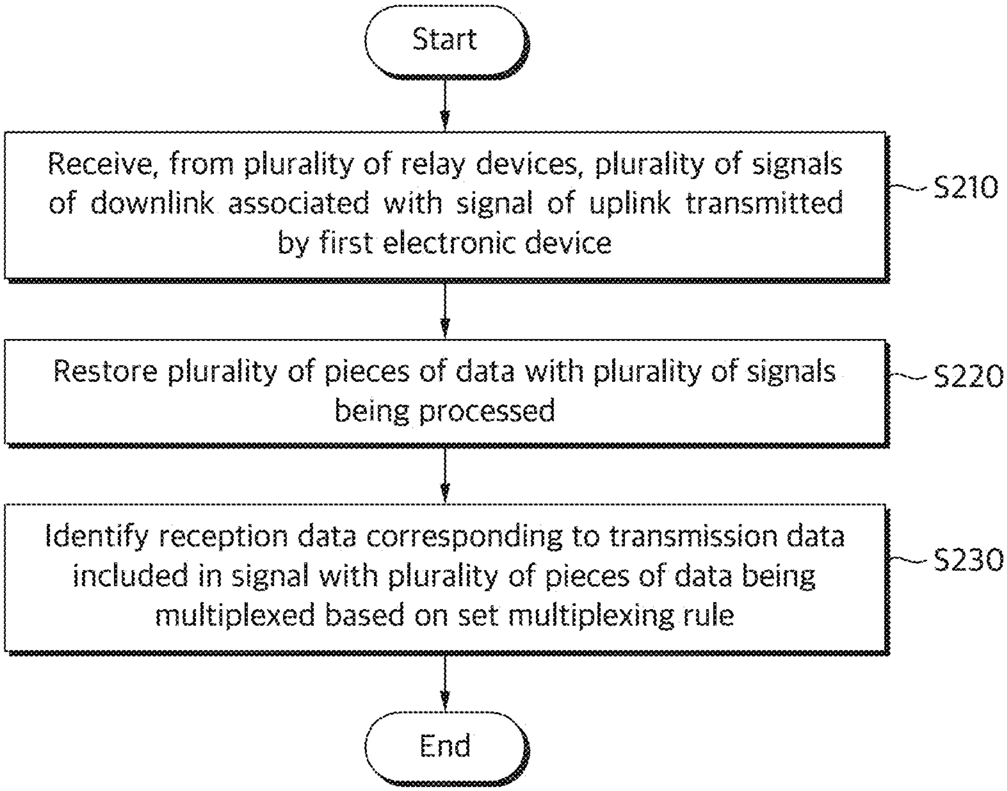
FIG. 2 is a flowchart illustrating a communication method of an electronic device.

FIG. 2 is a flowchart illustrating a communication method of an electronic device.

Referring to FIG. 2, it may be apparently understood that a portion of operations of the electronic device 100 communicating with the first electronic device 120 through a plurality of relay devices may be changed or replaced in the scope in which those skilled in the art may have understanding, and that an order between the operations may be changed as well.

In operation S210, the electronic device 100 may receive, from a plurality of relay devices, a plurality of signals of a downlink associated with a signal of an uplink transmitted by a first electronic device.

According to an example embodiment, the first electronic device 120 may transmit a signal to the plurality of relay devices. The first electronic device 120 may perform modulation, channel encoding, signal amplification, or the like on transmission data to transmit. The first electronic device 120 may transmit, to the plurality of relay devices, a signal of an uplink generated with the modulation, the channel encoding, the signal amplification, or the like being performed. The signal of the uplink may include the transmission data. In the present disclosure, that a signal includes data may indicate that restoration of the data sent by a sender is possible through processing such as demodulation and error correction by a recipient. In order to transmit the signal of the uplink to the plurality of relay devices, an antenna of the first electronic device 120 may face the plurality of relay devices in real time. Accordingly, information on travel paths of the plurality of relay devices may be transmitted to the first electronic device 120.

At this point, the channel encoding may be a signal conversion process performed by a sender so that a recipient detects and corrects an error in an information transmission process through a channel. Particularly, structured redundancy information may be inserted in transmitted data with the channel encoding being performed. Accordingly, the recipient may use the redundancy information according to a set rule, and a bit error rate associated with the signal may be improved. The channel encoding in the present disclosure may be one of Reed-Solomon encoding and convolution encoding, but is not limited to either of them.

According to an example embodiment, the plurality of relay devices may be positioned in a first area associated with an antenna beam of the first electronic device 120. Each of the plurality of relay devices may receive the signal from the first electronic device 120 and restore first data from the signal.

In this regard, a first relay device of the plurality of relay devices may receive the signal of the uplink transmitted by the first electronic device 120, identify the first data corresponding to the transmission data included in the signal with the signal being processed, identify division data including at least a portion of the first data based on a set division rule, and transmit a signal of the downlink including the division data to the electronic device 100.

Specifically, the plurality of relay devices may restore the first data with demodulation and error correction being performed on the signal received from the first electronic device 120. More specifically, since the channel encoding may be performed in the first electronic device 120, the plurality of relay devices may restore the first data from demodulated data including redundancy information by using a set rule. Since EIRP associated with transmission performance of the first electronic device 120 may have a relatively large value, the data in the first electronic device 120 and the first data restored in a relay device may be substantially identical. More specifically, a ratio of the number of bits generating an error to the total number of bits of the restored first data may be lower than a predetermined level. In other words, the quality of the signal transmitted by the first electronic device 120 may be secured at the predetermined level or more.

When each of a plurality of relay devices having lower EIRP transmits the signal of the downlink at a speed equal to that of the signal received from the first electronic device 120, there is a concern that a bit error rate associated with the signal of the downlink may greatly deteriorate. Particularly, the bit error rate associated with the signal of the downlink may greatly deteriorate with a data volume being increased, which means that quality of the signal transmitted by the relay device may drop below a predetermined level.

At this point, a transmission speed of the signal of the uplink received by the plurality of relay devices and a transmission speed of the signal of the downlink transmitted by the plurality of relay devices in a communication system may be asymmetrically set with the plurality of relay devices using multi-connectivity. In other words, although EIRP of each of the plurality of relay devices is low, the bit error rate of the signal of the downlink may be improved with the plurality of relay devices using the multi-connectivity.

In association with the multi-connectivity, the plurality of relay devices divides the first data into a plurality of pieces of first data based on a set division rule. At this point, the plurality of pieces of first data may be a set of the division data of each of the plurality of relay devices.

Each of the plurality of relay devices may perform modulation, channel encoding, signal amplification, or the like, and the like on the corresponding division data, and the signal of the downlink corresponding to the division data may be generated. The plurality of relay device may transmit, to the electronic device 100, a plurality of signals of the downlink generated with the modulation, the channel encoding, the signal amplification, or the like being performed. An antenna included in the electronic device 100 may face the plurality of relay devices in real time. The electronic device 100 may receive the information on the travel paths of the plurality of relay devices in real time. In this regard, the plurality of relay devices may be simultaneously positioned in the first area associated with a beam of a first antenna included in the first electronic device 120 which is a sender and an area associated with a beam of the antenna included in the electronic device 100 which is a recipient.

Accordingly, the electronic device 100 may receive the plurality of signals of the downlink associated with the signal of the uplink transmitted by the first electronic device 120 from the plurality of relay devices.

In operation S220, the electronic device 100 may restore a plurality of pieces of data with the plurality of signals being processed.

According to an example embodiment, the electronic device 100 may process the plurality of received signals and restore the plurality of pieces of data corresponding to the plurality of signals. More specifically, the electronic device 100 may be a ground terminal, and a G/T, which is a gain to noise temperature ratio, associated with reception performance of the electronic device 100 may have a relatively large value. In other words, when the electronic device 100 restores the plurality of pieces of data from the plurality of received signals, a bit error rate may be maintained to be lower than a predetermined level.

According to an example embodiment, the electronic device 100 may restore the plurality of pieces of data with demodulation and error correction being performed on the plurality of signals. In this regard, before the relay device transmits the signal of the downlink, the relay device may perform the channel encoding. In other words, the electronic device 100 may identify a plurality of pieces of data demodulated from the plurality of signals with the demodulation being performed and restore the plurality of pieces of data from the plurality of pieces of demodulated data including redundancy information by using a set rule.

The plurality of relay devices may transmit a plurality of signals of the downlink corresponding to the plurality of pieces of first data, and a volume of data included in each of the plurality of signals of the downlink may be less than a volume of the transmission data included in the signal of the uplink. In other words, although EIRP associated with transmission performance of the relay device has a value less than a value of the EIRP associated with the transmission performance of the first electronic device 120, a bit error rate of a signal transmitted by each of the plurality of relay devices may be maintain to be lower than a predetermined level. In this regard, the plurality of pieces of first data in the plurality of relay devices and the plurality of pieces of data restored in the electronic device 100 may be substantially identical. Alternatively, with respect to each of the plurality of pieces of restored data, a ratio of the numbers of bits generating an error to the total number of bits of restored data may be lower than a predetermined level.

In operation S230, the electronic device 100 may identify reception data corresponding to the transmission data included in the signal with the plurality of pieces of data being multiplexed based on a set multiplexing rule.

According to an example embodiment, the electronic device 100 may multiplex the plurality of pieces of restored data based on the set multiplexing rule. More specifically, the electronic device 100 may identify reception data corresponding to the transmission data included in the signal by multiplexing the plurality of pieces of data through a multiplexer according to the set multiplexing rule. The multiplexer may identify the reception data corresponding to the transmission data by identifying a value of a bit in the plurality of pieces of data according to a set order. The reception data identified by the electronic device 100 may be substantially identical to the transmission data transmitted by the first electronic device 100. More specifically, when the reception data is compared to the transmission data, a ratio of the number of bits generating an error to the total number of bits may be identified as being lower than a predetermined level.

The set multiplexing rule may be information on an order associated with multiplexing of the plurality of pieces of data and may be determined based on an order associated with division of the first data into the plurality of pieces of first data. The order associated with the multiplexing may be a reverse order of the order associated with the division.

Figure 3:
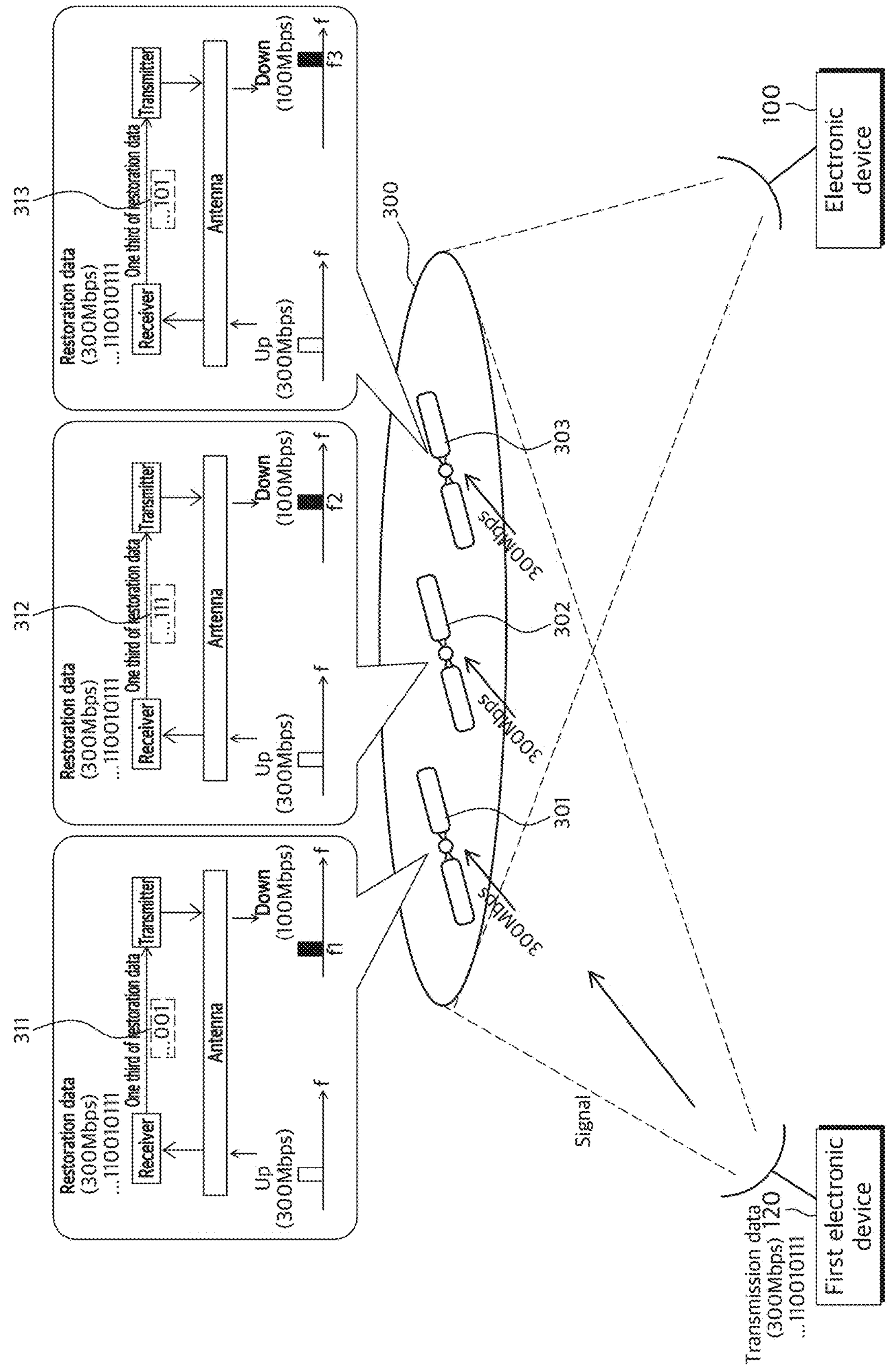
FIG. 3 is a diagram illustrating an example embodiment of a first electronic device transmitting a signal of an uplink including transmission data to a plurality of relay devices and the plurality of relay devices generating a plurality of signals.
Figure 4:
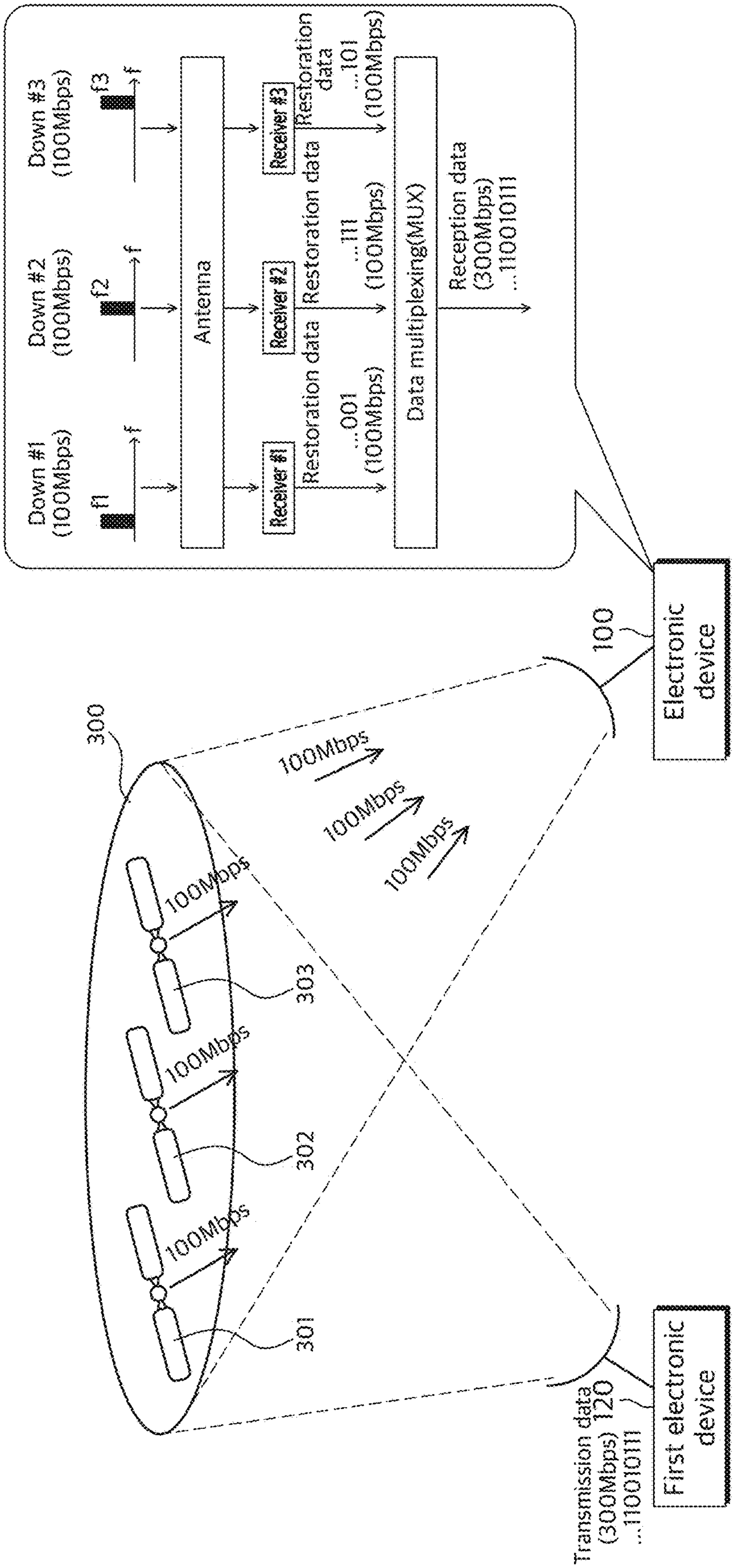
FIG. 4 is a diagram illustrating an example embodiment of a plurality of relay devices transmitting a plurality of signals to an electronic device and the electronic device identifying reception data corresponding to transmission data included in a signal of an uplink transmitted by a first electronic device with a plurality of pieces of data being multiplexed, following FIG. 3.

A communication system including the first electronic device 120, a plurality of relay devices, and the electronic device 100 is described in detail with reference to FIGS. 3 and 4. Example embodiments of FIGS. 3 and 4 are associated with an example embodiment of the electronic device 100 and the first electronic device 120 performing communication through a first relay device 301, a second relay device 302, and a third relay device 303. The first relay device 301, the second relay device 302, and the third relay device 303 may be positioned in a beam area of an antenna included in the electronic device 100 and a first beam area of a first antenna included in the first electronic device 120.

FIG. 3 is a diagram illustrating an example embodiment of a first electronic device transmitting a signal of an uplink including transmission data to a plurality of relay devices and the plurality of relay devices generating a plurality of signals.

Operation 1: Transmitting a Signal of an Uplink

According to an example embodiment, the first electronic device 120 may transmit a signal of an uplink to a plurality of relay devices. Referring to FIG. 3, transmission data which the first electronic device 120 as a transmission terminal is to transmit to the electronic device 100 as a reception terminal may be . . . 110010111(2). In the present disclosure, data to transmit may be referred to as the transmission data, sent data or target data.

The first electronic device 120 may change the transmission data into a corresponding signal with modulation, channel encoding, and signal amplification being performed on the transmission data. In addition, the modulation may be digital modulation such as phase shift keying, frequency shift keying, amplitude shift keying, or quadrature amplitude modulation. The signal of the uplink transmitted to the plurality of relay devices may be a carrier wave which is an electromagnetic wave modulated for sending information.

In a communication environment in which large traffic is transmitted in a short time, a volume of the transmission data to transmit may be increased. Accordingly, traffic of the signal transmitted to the plurality of relay devices may be greatly increased. Referring to FIG. 3, the traffic of the signal transmitted to the plurality of relay devices may be 300 megabits per second (Mbps).

Operation 2: Restoring First Data from the Signal of the Uplink and Generating a Signal of a Downlink According to an example embodiment, the first relay device 301, the second relay device 302, and the third relay device 303 may individually receive the signal of the uplink. Traffic of the signal of the uplink received by the first relay device 301, the second relay device 302, and the third relay device 303 may be 300 Mbps. As described above, the first electronic device 120 as the ground terminal may include the large-sized antenna and the high-power amplifier, and thus may have a feature in which the EIRP associated with the transmission performance has a large value. In contrast, the plurality of relay devices may have a relatively low G/T. However, since signal quality is more affected by EIRP, although a G/T of the plurality of relay devices is relatively low, signal quality at a level at which data restoration is possible may be secured.

According to an example embodiment, each of the first relay device 301, the second relay device 302, and the third relay device 303 may perform demodulation and error correction on the received signal of the uplink and restore first data. The first data may be data identified with the signal of the uplink being processed in the plurality of relay devices. More specifically, the first data may be data in a binary form which is identified with the demodulation and the error correction being performed on the signal of the uplink.

Referring to FIG. 3, the first data may be shown as . . . 110010111(2). Last nine bits of the first data may be identical to last nine bits of the transmission data. However, a portion of bits of the first data not shown on the drawing may have an error, and a bit error rate associated with the first data may be calculated to be a value other than zero. In consideration of the fact that the signal quality at the level at which the data restoration is possible may be secured, the bit error rate may be calculated to be lower than or equal to a predetermined level.

According to an example embodiment, the plurality of relay devices may divide the first data into a plurality of pieces of first data. The plurality of pieces of first data may include at least a portion of the first data according to a set division rule. In other words, the set division rule may be a rule under which a value of a bit in the first data is allocated to a bit of the plurality of pieces of first data. More specifically, each of the plurality of pieces of first data may exclusively include a value of a bit in the first data. Accordingly, the plurality of pieces of first data may be divided so that a volume of data is minimized. FIG. 3 illustrates an example of a division rule under which each of the plurality of pieces of first data exclusively includes the value of the bit in the first data. However, the set division rule of the present disclosure is not limited thereto.

Referring to FIG. 3, the plurality of pieces of first data may include first division data 311, second division data 312, and third division data 313. Specifically, the first division data 311, the second division data 312, and the third division data 313 may be identified according to the following operation.

The first relay device 301 may identify the first division data 311 including a value of a 3 k-th bit of the restored first data. For example, 0, 0, and 1 which are respective values of a third, a sixth, and a ninth bits among the last nine bits of the first data may be included in the first division data 311 of the plurality of pieces of first data, which corresponds to the first relay device 301. In other words, the first division data 311 may be shown as . . . 001(2).

The second relay device 302 may identify the second division data 312 including a value of a 3 k+2-th bit of the first data. For example, 1, 1, and 1 which are respective values of a second, a fifth, and an eighth bits among the last nine bits of the first data may be included in the second division data 312 of the plurality of pieces of first data, which corresponds to the second relay device 302. In other words, the second division data 312 may be shown as . . . 111(2).

The third relay device 303 may identify the third division data 313 including a value of a 3 k+1-th bit of the first data. For example, 1, 0, and 1 which are respective values of a first, a fourth, and a seventh bits among the last nine bits of the first data may be included in the third division data 313 of the plurality of pieces of first data, which corresponds to the third relay device 303. In other words, the third division data 313 may be shown as . . . 101(2).

A data volume of each of the first division data 311, the second division data 312, and the third division data 313 may be decreased to be one third of a volume of the transmission data with the first data being divided into the first division data 311, the second division data 312, and the third division data 313. In addition, the plurality of relay devices may generate a plurality of signals of a downlink with modulation, channel encoding, and signal amplification being performed on a plurality of pieces of division data. In other words, each of the plurality of signals may be generated based on corresponding division data, and traffic of each of the plurality of signals may be identified as being 100 Mbps which is one third of the traffic of the signal of the uplink.

Since the first data is divided into the first division data 311, and the second division data 312, and the third division data 313, the traffic of each of the plurality of signals may be less than the traffic of the signal of the uplink corresponding to the transmission data. In other words, although EIRP performance of a relay device is lower than EIRP performance of the ground terminal, a bit error rate associated with the plurality of signals of the downlink may be maintained to be lower than or equal to a predetermined level.

When the electronic device 100 multiplexes a plurality of pieces of data in order of a value of a bit of the third division data 313, a value of a bit of the second division data 312, and a value of a bit of the first division data 311, reception data corresponding to the transmission data may be restored so as to correspond to the transmission data. In other words, in order for the electronic device 100 to restore the reception data substantially identical to the transmission data, the electronic device 100 may be configured (or required) to receive an order associated with multiplexing of the plurality of pieces of data.

A set multiplexing rule may show an order in which the plurality of pieces of data restored with the plurality of signals of the downlink being processed is multiplexed. The set multiplexing rule may be information on the order associated with the multiplexing of the plurality of pieces of data and may be associated with an order associated with division of the first data into the plurality of pieces of first data. More specifically, the order associated with the multiplexing may be a reverse order of the order associated with the division.

The electronic device 100 may identify the order associated with the multiplexing of the plurality of pieces of data according to various example embodiments.

According to an example embodiment, the plurality of signals may be signals having different frequencies and generated with the plurality of pieces of first data being modulated in the plurality of relay devices. For example, a frequency of a signal of the downlink generated in the third relay device 303 may be f3. A frequency of a signal of the downlink generated in the second relay device 302 may be f2. A frequency of a signal of the downlink generated in the first relay device 301 may be f1. For example, the order associated with the multiplexing may indicate that the plurality of pieces of data is multiplexed in order from the f3 having a high frequency to the f1 having a low frequency.

According to another example embodiment, the electronic device 100 may identify, based on values in set positions of the plurality of pieces of first data, information on the order associated with the multiplexing. More specifically, the values in the set positions of the plurality of pieces of first data may be values in set bits of the plurality of the first data. The order associated with the multiplexing may be determined based on sizes of the values in the set positions of the plurality of pieces of data. At this point, a set position may be an upper bit of each division data.

In this regard, the plurality of pieces of first data may further include information on the order associated with the division as well as at least the portion of the first data. For example, a value of two upper bits of the third division data 313 may be 01(2). A value of two upper bits of the second division data 312 may be 10(2). A value of two upper bits of the first division data 311 may be 11(2). The order associated with the multiplexing may be indicate that the plurality of pieces of data is multiplexed in order from division data having a small value of two upper bits to division data having a large value of that. In other words, an order associated with multiplexing of the plurality of pieces of first data may be an order of the third division data 313, the second division data 312, and the first division data 311.

FIG. 4 is a diagram illustrating an example embodiment of a plurality of relay devices transmitting a plurality of signals to an electronic device and the electronic device identifying reception data corresponding to transmission data included in a signal of an uplink transmitted by a first electronic device with a plurality of pieces of data being multiplexed, following FIG. 3.

Operation 3: Transmitting a Plurality of Signals of a Downlink

A plurality of relay devices may transmit a plurality of signals to the electronic device 100. As described above, the plurality of signals may be signals generated in the plurality of relay devices based on the plurality of pieces of first data. More specifically, each of the plurality of signals may be a signal of a downlink generated with modulation, channel encoding, signal amplification, and the like being performed on division data of each relay device.

According to an example embodiment, the electronic device 100 may identify a plurality of pieces of demodulated data with the plurality of signals being demodulated. In addition, the electronic device 100 may restore a plurality of pieces of data with an error in the plurality of pieces of demodulated data being corrected. Since the channel encoding may be performed on the division data, the plurality of pieces of demodulated data may include redundancy information. Thus, the electronic device 100 may restore the plurality of pieces of data from the plurality of pieces of demodulated data including the redundancy information by using a set rule.

Referring to FIG. 4, individual traffic of a plurality of signals of the downlink may be 100 Mbps, and the traffic may be lower than 300 Mbps which is traffic of a signal of an uplink. Since each traffic of the plurality of signals of the downlink may be lower than the traffic of the signal of the uplink, a bit error rate associated with the signal of the downlink may be greatly improved. The plurality of piece of data may be substantially identical to the corresponding plurality of pieces of first data. More specifically, a ratio of the number of bits generating an error to the total number of bits of the plurality of pieces of restored data may be lower than a predetermined level.

According to an example embodiment, the electronic device 100 may identify data corresponding to the signal of the uplink with the plurality of pieces of data being multiplexed based on a set multiplexing rule. The set multiplexing rule may be information on an order associated with multiplexing of the plurality of pieces of data and may be determined based on an order associated with division of first data into the plurality of pieces of first data. The order associated with the multiplexing may be a reverse order of the order associated with the division.

Referring to FIG. 4, when the plurality of pieces of data is multiplexed in order of a value of a bit of the third division data 313, a value of a bit of the second division data 312, and a value of a bit of the first division data 311, reception data corresponding to transmission data may be restored.

More specifically, when the plurality of pieces of data is multiplexed in order of 1 which is a value of a first bit among last three bits of the third division data 313, 1 which is a value of a first bit among last three bits of the second division data 312, 0 which is a value of a first bit among last three bits of the first division data 311, 0 which is a value of a second bit among the last three bits of the third division data 313, 1 which is a value of a second bit among the last three bits of the second division data 312, 0 which is a value of a second bit among the last three bits of the first division data 311, 1 which is a value of a third bit among the last three bits of the third division data 313, 1 which is a value of a third bit among the last three bits of the second division data 312, and 1 which is a value of a third bit among the last three bits of the first division data 311, the reception data corresponding to the transmission data may be restored.

According to an example embodiment, the plurality of signals may be signals having different frequencies and generated with the plurality of pieces of first data being modulated in the plurality of relay devices. At this point, the electronic device 100 may identify, based on a plurality of frequencies corresponding to the plurality of signals, the order associated with the multiplexing of the plurality of pieces of data. For example, a frequency of a signal of the downlink generated in the third relay device 303 may be f3. A frequency of a signal of the downlink generated in the second relay device 302 may be f2. A frequency of a signal of the downlink generated in the first relay device 301 may be f1. At this point, the order associated with the multiplexing may be an order in which the plurality of pieces of data is multiplexed in order from the f3 having a high frequency to the f1 having a low frequency.

According to another example embodiment, the electronic device 100 may identify, based on values in set positions of the plurality of pieces of first data, information on the order associated with the multiplexing. At this point, the order associated with the multiplexing of the plurality of pieces of data may be determined according to sizes of the values in the set positions. In this regard, the plurality of pieces of first data may further include the information on the order associated with the multiplexing as well as at least a portion of the first data. For example, the information on the order associated with the multiplexing may be stored in a set number of upper bits in the division data.

A value of two upper bits of the third division data 313 may be 01(2). A value of two upper bits of the second division data 312 may be 10(2). A value of two upper bits of the first division data 311 may be 11(2). At this point, each of the plurality of pieces of data restored in the electronic device 100 may be identical to one of the third division data 313, the second division data 312, and the first division data 311. In other words, values of two upper bits of the plurality of pieces of restored data may be 01, 10, and 11. Accordingly, the electronic device 10 may restore, based on the values of the two upper bits, the reception data by multiplexing the plurality of pieces of data.

In addition, a value stored in the set number of upper bits in the division data may only be the information on the order associated with the multiplexing and may be irrelevant to the transmission data from the electronic device 120. In other words, the electronic device 100 may identify, based on a value stored in a set number of upper bits of each of the plurality of pieces of data, the order associated with the multiplexing and then perform the multiplexing based on the plurality of pieces of data of which the set number of upper bits are removed.

In consideration of a communication environment in which performance of a relay device is lower than that of the first electronic device 120 and the electronic device 100, signal quality of the downlink may be maintained to be higher than or equal to a predetermined level with a transmission speed of the downlink being set to be lower than a transmission speed of the uplink by using multi-connectivity of the plurality of relay devices. Accordingly, a transmission speed and a bit error rate of a communication system may be improved.

FIG. 3 illustrates an example in which volumes of the plurality of pieces of first data corresponding to the plurality of relay devices are equal to each other, but it is merely an example. For example, the volumes of the plurality of pieces of first data may be differently determined to be different from each other based on an EIRP value associated with transmission performance of the plurality of relay devices. In other words, volumes of the plurality of pieces of data may be determined based on the transmission performance of the plurality of relay devices.

For example, transmission performance of the first relay device 301 may be two times transmission performance of the second relay device 302 and the third relay device 303. At this point, division data corresponding to the first relay device 301 may have a volume which is two times those of division data corresponding to the second relay device 302 and the third relay device 303. In this regard, the division data corresponding to the first relay device 301 may include values of a 4 k-th bit and a 4 k+1-th bit of the first data. When the traffic of the signal of the uplink is 300 Mbps, traffic of a signal of the downlink received from the first relay device 301 by the electronic device 100 may be 150 Mbps. In addition, the division data corresponding to the second relay device 302 may include a value of a 4 k+2-th bit of the first data, and the division data corresponding to the third relay device 303 may include a value of 4 k+3-th bit of the first data. At this point, each traffic of signals of the downlink received from the second relay device 302 and the third relay device 303 by the electronic device 100 may be 75 Mbps.

Figure 5:
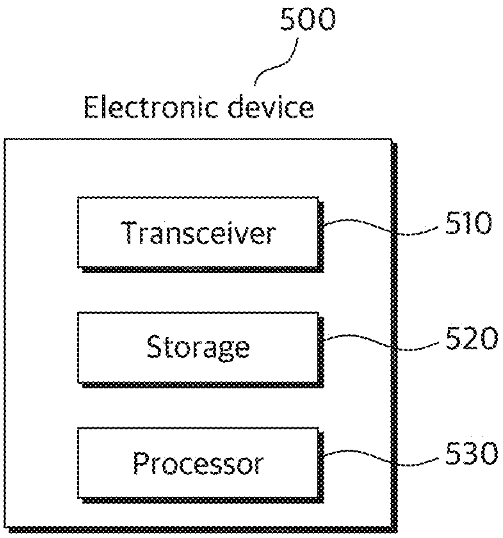
FIG. 5 is a block diagram illustrating an electronic device according to an example embodiment.

FIG. 5 is a block diagram illustrating an electronic device according to an example embodiment.

An electronic device 500 may correspond to the electronic device 100 of the present disclosure. The electronic device 500 of the present disclosure may include a transceiver 510, a storage 520, and a processor 530 according to an example embodiment. Since elements illustrated by FIG. 5 are not essential for implementing an electronic device, those skilled in the art related to the example embodiment may understand that the electronic device 500 described in the present disclosure may have more or fewer elements than the above-described elements. Meanwhile, the processor 530 may include at least one processor in example embodiments.

The transceiver 510 may communicate with an external device by using a wired or wireless communication technology and include the transceiver 510. The external device may be a client device, a terminal, an open-source platform, or a server. In addition, the external device may include a plurality of devices. The communication technology used by the transceiver 510 may be satellite communication, but it is merely an example. For example, the communication technology used by the transceiver 510 may include Global System for Mobile communication (GSM), Code Division Multi Access (CDMA), Long Term Evolution (LTE), 5th Generation, (5G), a wireless LAN (WLAN), wireless-fidelity (Wi-Fi), Bluetooth, radio frequency identification (RFID), infrared data association (IrDA), ZigBee, near field communication (NFC), or the like. When the communication system 10 of the present disclosure is an OBP satellite communication system based on an OBP relay, the transceiver 510 may include an antenna. According to an example embodiment, the transceiver 510 may receive each of a plurality of signals associated with a signal transmitted by the first electronic device 120 from a plurality of relay devices.

The storage 520 may store information for performing at least one of the methods described above with reference to FIGS. 1 through 5. The storage 520 may be referred to as a memory and may be a volatile or a nonvolatile memory. In addition, the storage 520 may store one or more instructions for performing an operation of the processor 530. For example, the storage 520 may temporarily store a plurality of pieces of data identified with the plurality of signals being processed. In addition, the storage 520 may store at least one of a set multiplexing rule, the plurality of pieces of data, and reception data.

The processor 530 may control overall operations of the electronic device 500 and process a signal and data. The processor 530 may perform one of the methods described above with reference to FIGS. 1 through 5. The processor 530 may control example embodiments performed by the electronic device 500 through interaction with the transceiver 510, the storage 520, and elements further includable in the electronic device 500 in addition thereto. According to an example embodiment, the processor 530 may restore the plurality of pieces of data with the plurality of signals being processed and identify the reception data corresponding to the transmission data with the plurality of pieces of data being multiplexed based on a set multiplexing rule.

The present specification and drawings have been described with respect to the example embodiments of the present disclosure. Although specific terms are used, it is only used in a general sense to easily explain the technical content of the present disclosure and to help the understanding of the invention, and is not intended to limit the scope of the specification. It will be apparent to those skilled in the art that other modifications based on the technical spirit of the present disclosure may be implemented in addition to the embodiments disclosed herein.

The electronic apparatus or terminal in accordance with the above-described embodiments may include a processor, a memory which stores and executes program data, a permanent storage such as a disk drive, a communication port for communication with an external device, and a user interface device such as a touch panel, a key, and an icon. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt integrated circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, assembler, and Python including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A communication method of an electronic device, the communication method comprising:

receiving, from a plurality of relay devices, a plurality of signals of a downlink associated with a signal of an uplink transmitted by a first electronic device;

restoring a plurality of pieces of data with the plurality of signals being processed; and identifying reception data corresponding to transmission data included in the signal with the plurality of pieces of data being multiplexed based on a set multiplexing rule, wherein, a transmission speed of the signal and a transmission speed of the plurality of signals are asymmetrically set, and volumes of the plurality of pieces of data are determined to correspond to a transmission performance of the plurality of relay devices.

2. The communication method of claim 1, wherein first data is data identified with the signal being processed in the plurality of relay devices, and when the plurality of relay devices divides the first data into a plurality of pieces of first data based on a set division rule, the plurality of signals is a plurality of signals respectively corresponding to the plurality of pieces of first data transmitted from the plurality of relay devices.

3. The communication method of claim 2, wherein each of the plurality of pieces of first data includes at least a portion of the first data according to the set division rule.

4. The communication method of claim 2, wherein the plurality of signals is signals having different frequencies and generated with the plurality of pieces of first data being modulated in the plurality of relay devices, and the identifying of the reception data comprises:

identifying, based on a plurality of frequencies corresponding to the plurality of signals, an order associated with multiplexing of the plurality of pieces of data; and identifying, based on the order, the reception data with the plurality of pieces of data being multiplexed.

5. The communication method of claim 2, wherein the identifying of the reception data comprises:

identifying, based on values in set positions of the plurality of pieces of data, an order associated with multiplexing of the plurality of pieces of data; and identifying, based on the order, the reception data by multiplexing the plurality of pieces of data.

6. The communication method of claim 1, wherein the restoring of the plurality of pieces of data comprises:

identifying a plurality of pieces of demodulated data with the plurality of signals being demodulated; and restoring the plurality of pieces of data with an error in the plurality of pieces of demodulated data being corrected.

7. The communication method of claim 1, wherein the plurality of relay devices is a plurality of small communication satellites.

8. The communication method of claim 1, wherein the plurality of relay devices is simultaneously positioned in a first area associated with a first antenna included in the first electronic device and an area associated with an antenna included in the electronic device, and the set multiplexing rule corresponds to a set division rule in the plurality of relay devices.

9. An electronic device comprising:

a transceiver;

a storage configured to store one or more instructions; and a processor configured to execute the one or more instructions to perform the communication method of claim 1.

10. A non-transitory computer-readable recording medium comprising a computer program for performing the communication method of claim 1.

11. A communication system of a plurality of electronic devices using a relay device, the communication system comprising:

a first electronic device;

a plurality of relay devices; and an electronic device, wherein the first electronic device transmits a signal of an uplink including transmission data, the plurality of relay devices identifies first data corresponding to the transmission data with the signal being processed, divides the first data into a plurality of pieces of first data based on a set division rule, and transmits a plurality of signals of a downlink corresponding to the plurality of pieces of first data to the electronic device, and the electronic device receives the plurality of signals from the plurality of relay devices, restores a plurality of pieces of data with the plurality of signals being processed, and identifies reception data corresponding to the transmission data with the plurality of pieces of data being multiplexed based on a set multiplexing rule, wherein, a transmission speed of the signal and a transmission speed of the plurality of signals are asymmetrically set, and volumes of the plurality of pieces of data are determined to correspond to a transmission performance of the plurality of relay devices.

* * * * *